United States Patent
Stangeland et al.

(10) Patent No.: US 12,029,268 B2
(45) Date of Patent: Jul. 9, 2024

(54) ARTICLE OF APPAREL INCLUDING INSULATION

(71) Applicant: Under Armour, Inc., Baltimore, MD (US)

(72) Inventors: Jeremy Stangeland, Baltimore, MD (US); Kyle Blakely, Baltimore, MD (US); Matthew Trexler, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 27 days.

(21) Appl. No.: 17/721,458

(22) Filed: Apr. 15, 2022

(65) Prior Publication Data

US 2022/0346478 A1 Nov. 3, 2022

Related U.S. Application Data

(62) Division of application No. 16/400,506, filed on May 1, 2019, now Pat. No. 11,324,266.

(Continued)

(51) Int. Cl.
B32B 5/02 (2006.01)
A41D 31/06 (2019.01)
(Continued)

(52) U.S. Cl.
CPC ............ *A41D 31/065* (2019.02); *B32B 5/022* (2013.01); *B32B 5/26* (2013.01); *D04H 1/43914* (2020.05);
(Continued)

(58) Field of Classification Search
CPC ........ A41D 31/065; A41G 9/00; B32B 5/022; B32B 5/26; B32B 2250/03; B32B 2250/20; B32B 2260/021; B32B 2260/046; B32B 2262/00; B32B 2262/0246; B32B 2262/0253; B32B 2262/0261; B32B 2262/0276; B32B 2262/0284; B32B 2262/0292; B32B 2262/08;
(Continued)

(56) References Cited

U.S. PATENT DOCUMENTS 4,167,604 A 9/1979 Aldrich
4,304,817 A 12/1981 Frankosky
(Continued)

FOREIGN PATENT DOCUMENTS

CA 2269195 C 10/1999
CN 1332273 A * 1/2002 ............... A41G 9/00
(Continued)

OTHER PUBLICATIONS

Down and Feather Definitions, IDFL Laboratory and Institute, www.idfl.com, Feb. 18, 2010, 7 pages.
(Continued)

*Primary Examiner* — Michael A Tolin
(74) *Attorney, Agent, or Firm* — Edell, Shapiro & Finnan, LLC (57) ABSTRACT

An article of apparel including insulation material includes an insulating layer formed of waterfowl fibers and synthetic fibers. The waterfowl fibers can be present in an amount of at least 20% by weight of the insulating layer. The insulating layer is generally free of waterfowl plumage.

16 Claims, 5 Drawing Sheets

Related U.S. Application Data (60) Provisional application No. 62/758,070, filed on Nov. 9, 2018, provisional application No. 62/664,954, filed on May 1, 2018.

(51) Int. Cl.
*B32B 5/26* (2006.01)
*D04H 1/4266* (2012.01)
*D04H 1/4382* (2012.01)
*D04H 1/4391* (2012.01)

(52) U.S. Cl.
CPC ....... *B32B 2250/03* (2013.01); *B32B 2262/00* (2013.01); *B32B 2307/304* (2013.01); *D06N 2201/06* (2013.01); *D10B 2211/01* (2013.01); *D10B 2501/04* (2013.01)

(58) Field of Classification Search
CPC ........ B32B 2307/304; B32B 2307/718; B32B 2437/00; B32B 2601/00; D04H 1/00; D04H 1/02; D04H 1/4266; D04H 1/43835; D04H 1/4391; D04H 1/43914; D04H 1/54; D04H 1/542; D04H 1/55; D04H 1/559; D04H 1/74; D06M 19/00; D06N 2201/06; D10B 2211/01; D10B 2501/04

See application file for complete search history.

(56) References Cited

U.S. PATENT DOCUMENTS

| | | | | |
|---|---|---|---|---|
| 4,477,515 A | * | 10/1984 | Masuda | D04H 1/43914 |
| | | | | 428/362 |
| 4,520,066 A | * | 5/1985 | Athey | D04H 1/54 |
| | | | | 428/362 |
| 5,408,700 A | | 4/1995 | Reuben et al. | |
| 5,437,922 A | * | 8/1995 | Jackson | D04H 1/43838 |
| | | | | 428/920 |
| 5,692,245 A | | 12/1997 | Reuben | |
| 5,799,600 A | | 9/1998 | Reuben | |
| 6,025,041 A | | 2/2000 | Reuben | |
| 9,380,893 B2 | | 7/2016 | Reuben | |
| 9,723,882 B2 | | 8/2017 | Reuben | |
| 9,788,605 B2 | | 10/2017 | Reuben | |
| 9,949,583 B2 | | 4/2018 | Reuben | |
| 2006/0143871 A1 | | 7/2006 | Zhang | |
| 2014/0206796 A1 | | 7/2014 | Allampalayam Jayaraman et al. | |
| 2016/0339664 A1 | * | 11/2016 | Gallagher | B32B 7/12 |
| 2016/0362547 A1 | | 12/2016 | Reuben | |
| 2017/0071367 A1 | | 3/2017 | Reuben | |

FOREIGN PATENT DOCUMENTS

| | | |
|---|---|---|
| CN | 1384236 A | 12/2002 |
| CN | 103276530 A | 9/2013 |
| CN | 104195665 A | 12/2014 |
| CN | 104195668 B | 5/2016 |
| CN | 106621569 A | 5/2017 |
| EP | 2941585 B1 | 6/2017 |
| FR | 2824083 A1 | 10/2002 |
| JP | S61213087 C | 9/1986 |
| JP | 2002105938 A | 4/2002 |
| RU | 169518 U1 | 3/2017 |
| WO | 0056971 A1 | 9/2000 |
| WO | 2017027260 A1 | 2/2017 |
| WO | 2017098478 A1 | 6/2017 |
| WO | 2018073631 A1 | 4/2018 |
| WO | 2018104768 A1 | 6/2018 |

OTHER PUBLICATIONS

PCT International Search Report and the Written Opinion, PCT/US2019/030146, Aug. 15, 2019, 10 pages.
Extended European Search Report in counterpart European Application No. 19795953.9-1102, dated Jan. 24, 2022, 8 pages.

* cited by examiner

ARTICLE OF APPAREL INCLUDING INSULATION

CROSS-REFERENCE TO RELATED APPLICATIONS

This application is a divisional of U.S. patent application Ser. No. 16/400,506, filed May 1, 2019, and entitled "Article of Apparel Including Insulation", now U.S. Pat. No. 11,324,266, which claims priority from U.S. Provisional Patent Application No. 62/664,954, filed May 1, 2018, and entitled "Insulating Nonwoven Textile," and also from U.S. Provisional Patent Application No. 62/758,070, filed Nov. 9, 2018, and entitled "Insulating Nonwoven Textile," the entire disclosures of which are incorporated herein by reference.

FIELD OF THE INVENTION

The present invention is directed toward insulation material including waterfowl fibers and, in particular, to an article of apparel utilizing the insulation material.

BACKGROUND OF THE INVENTION

Waterfowl material such as goose and duck down and/or feathers have been used as insulation material in apparel (e.g., down insulation for jackets), bedding, pillows, sleeping bags, etc. In general, extracted waterfowl material is sent for processing where the material is divided into its constituent components (down, feathers, and fibers). Specifically, down clusters are separated from the feathers, while both the down and the feathers are separated from fibers (down fibers and feather fibers). The down clusters and waterfowl feathers are directed toward conversion as insulation material. The individual fibers, however, are discarded as waste and sent to a landfill.

It would be desirable to provide insulation that utilizes the waste fiber, preventing the fiber from being directed to a landfill.

BRIEF SUMMARY OF THE INVENTION

An article of apparel includes an outer layer, an inner layer, and an insulation material positioned between the layers. The insulation material may include a central insulating layer and containment layers positioned on either side of the insulating layer. The insulating layer may include one or more of natural fibers and synthetic fibers. The natural fibers include waterfowl fibers. The synthetic fibers include structural fibers and binding fibers. The resulting insulation material may include an insulating layer that is generally free of waterfowl plumage. Processes for forming the insulation material and the article of apparel are further disclosed.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION OF THE INVENTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1A:
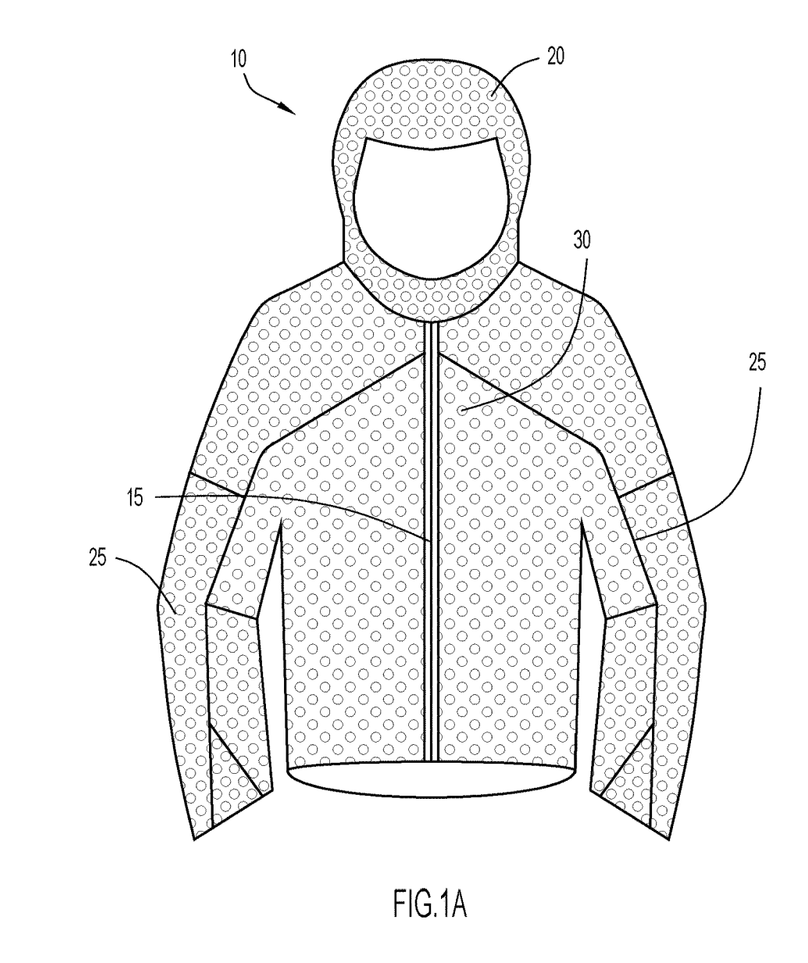
FIGS. 1A and 1B illustrate front and rear views, respectively, of an article of apparel in accordance with an embodiment of the present invention.
Figure 1B:
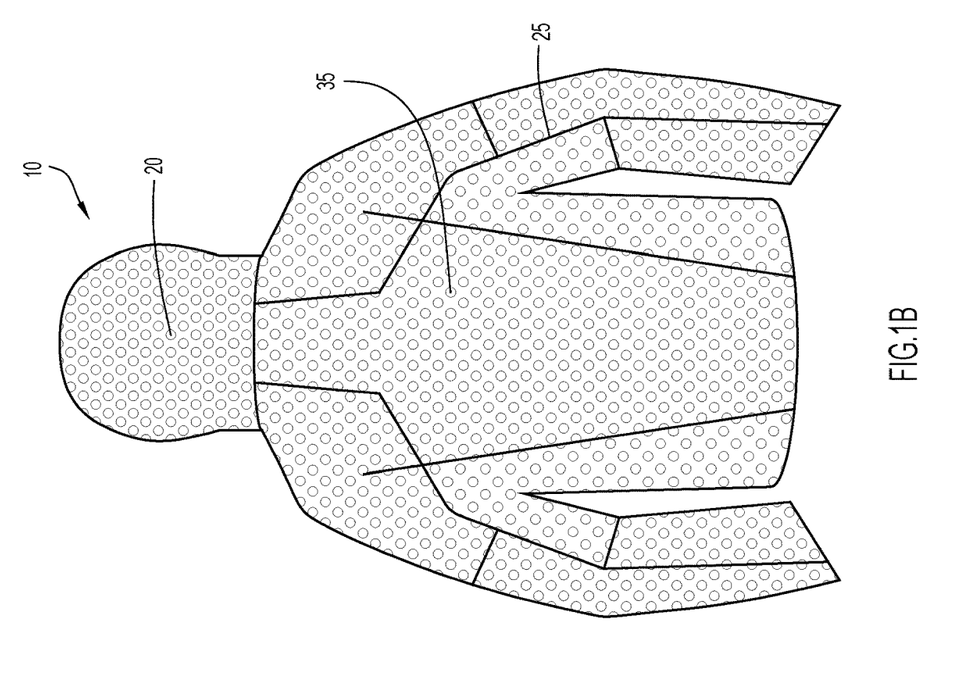

Referring to FIGS. 1A and 1B, the article of apparel may be in the form of a jacket 10 that includes a main trunk or torso section 15, a hood section 20 that extends from an upper portion of the torso section and is configured to pull over and cover portions of the head of the wearer, and arm sleeve sections 25 extending transversely from opposing upper side portions (which correspond with the shoulders of the wearer) of the torso section. The torso section 15 further includes a front side 30 that corresponds with the chest and abdomen of the wearer and a rear side 35 that corresponds with the back of the wearer.

The jacket 10 may include an outer or shell layer and an inner or lining layer coupled to the shell layer to define a pocket, chamber or gap therebetween. Insulation material is disposed within the chamber, between the shell layer and the lining layer. The shell layer may be a breathable textile configured to provide moisture transferability from the article of apparel into the surrounding environment. Additionally, the shell layer may be a wind-resistant or windproof textile. The lining layer may be a breathable textile.

Figure 2:
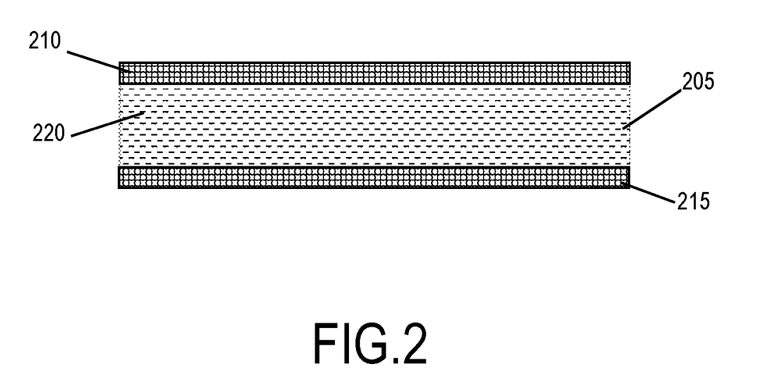
FIG. 2 illustrates a cross sectional view of insulation material in accordance with an embodiment of the present invention.

Referring to the embodiment illustrated in FIG. 2, the insulation material 200 is a composite structure including an insulating layer 205, a first or upper scrim layer 210 coupled (e.g., bonded) to the first or upper surface of the insulating layer, and a second or lower scrim layer 215 coupled (e.g., bonded) to the second or lower surface of the insulating layer.

In accordance with example embodiments, the insulating layer 205 may be a nonwoven web of fibers 220. In an embodiment, the insulating layer 205 includes natural fibers and synthetic fibers. The natural fibers utilized in forming the insulating layer 205 are animal fibers and waterfowl fibers or fibers obtained from the plumage of waterfowl (e.g., ducks, geese and/or any other type of aquatic bird). As used herein, the phrase "waterfowl fibers" refers to down fibers, feather fibers, or a combination of down fibers and feather fibers. The phrase "waterfowl plumage" refers to the outgrowth of waterfowl consisting of feathers and down/down clusters. Waterfowl fibers, then, are distinct from waterfowl plumage.

Figure 3A:
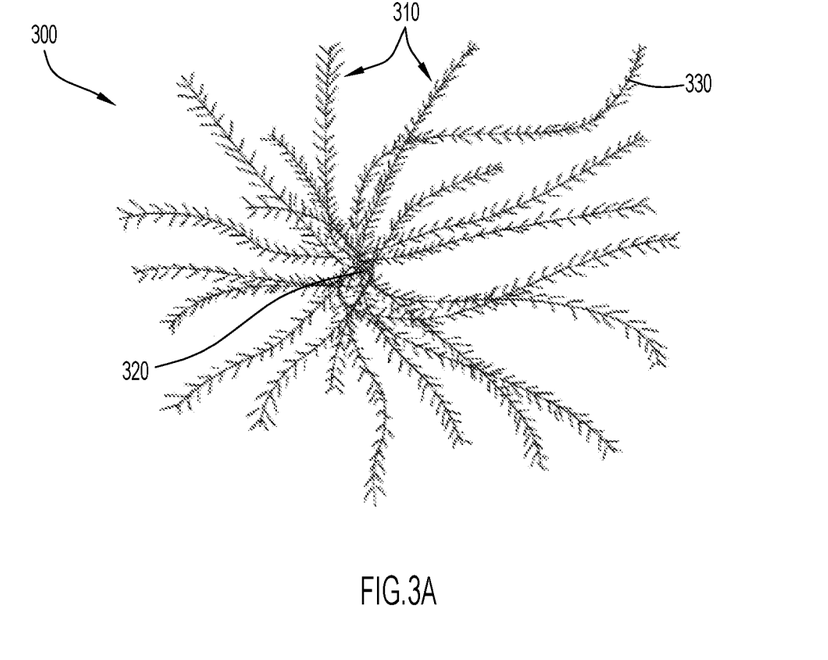
FIG. 3A illustrates a down cluster.
Figure 3B:
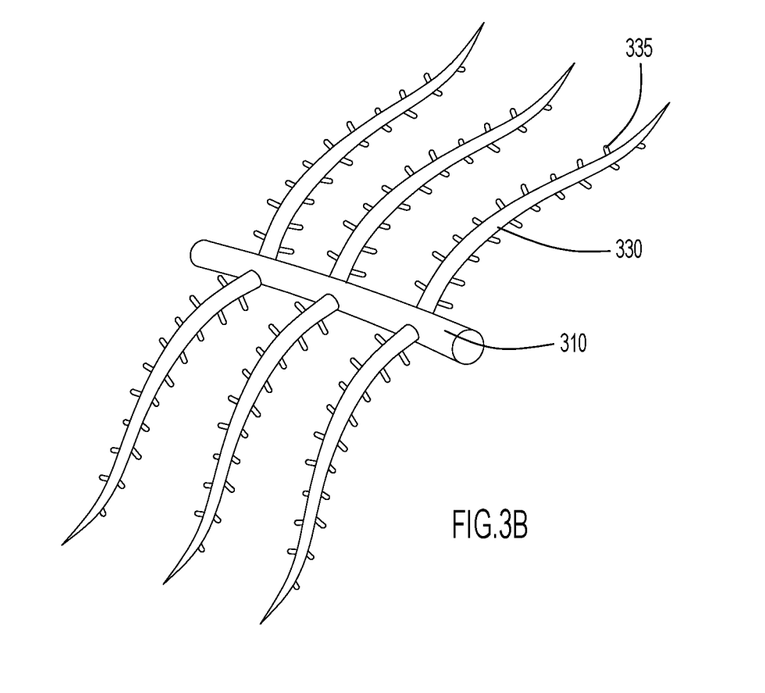
FIG. 3B illustrates a detached barb of a down cluster.

Down fibers are generated by down. Down, the soft undercoating plumage of waterfowl, includes down clusters. Referring to FIG. 3A, a down cluster 300 is a three-dimensional structure with at least two barbs/filaments 310 connected at the core or quill point 320 (the core or quill point lacks a quill shaft, thus is a shaftless quill point). Referring to FIG. 3B, each barb/filament may further include fibrils or barbules 330 extending therefrom and along the length of the barb 310, with each barbule 330 further including one or more hooklets 335 extending from the barbule 330 along the length of the barbule 330.

Down fibers, in contrast, are individual, unconnected or detached filaments or barbs (such as the detached barb 310 as shown in FIG. 3B). In particular, down fibers are detached barbs from down plumules and detached barbs from the basal ends of waterfowl feather quill shafts that are indistinguishable from the barbs of down. Accordingly, down fibers 310 are individual filaments or barbs, such as individual, detached barbs that separated from the core or point of a down cluster. In other words, down fibers are different from down and/or a down cluster, just as a down cluster is different from detached barbs or down fibers. To state in another manner, a plurality of down fibers or a plurality of detached barbs comprises a different structure in relation to down, a down cluster or a plurality of down clusters.

Feather fibers are generated by feathers. A waterfowl feather typically includes a central or main quill shaft from which barbs extend, and each barb further includes barbules extending therefrom with hooklets further extending from the barbules (i.e., in a manner similar to the detached barb 310 separated from a down cluster as depicted in FIG. 3B). Feather fibers, in contrast, are individual, unconnected barbs/filaments from the feather. In particular, feather fibers are defined as detached barbs of feathers which are not joined or attached to each other. Accordingly, feather fibers are individual filaments or barbs that are detached and separated from the central shaft of a feather. Thus, feather fibers or detached barbs are different from waterfowl feathers.

When separated from the shaft of a waterfowl feather, feather fibers have a structure similar to down fibers, where both feather fibers and down fibers are detached barbs that can include barbules and hooklets extending from the detached barbs. As previously noted herein, waterfowl fibers include down fibers, feather fibers or a combination of down and feather fibers.

As noted above, waterfowl fibers are generated as waste during the harvesting and processing of waterfowl plumage (down clusters and feathers). This is because conventional practices for producing insulation material utilize only the plumage, so significant effort is exerted to remove impurities such as dirt and waterfowl fibers. This waste material may include a substantial amount of waterfowl fibers. For example, the waste material can include at least 30% by weight of waterfowl fibers, or at least 40% by weight of waterfowl fibers, or even at least 50% by weight of waterfowl fibers.

In contrast to conventional processing techniques for producing down and/or feather products (e.g., for insulation), and in accordance with one or more embodiments of the present invention, it is desirable to capture as much of the waterfowl fibers (i.e., down fibers and/or feather fibers, which, as noted above, are individual detached barbs separated from down clusters or from feathers) for use in forming an insulating nonwoven textile. This is in contrast with conventional insulation including waterfowl material, which seeks to exclude the fibers as an impurity.

The waterfowl fibers may include any dimensions suitable for a desired purpose. By way of example, the waterfowl fibers may be staple fibers. By way of further example, the waterfowl fibers may possess lengths ranging from about 20 mm-80 mm (e.g., about 30 mm to about 40 mm, or about 38 mm).

As noted above, the insulating layer 205 further includes synthetic fibers. Synthetic fibers are strands (yarns or filaments) formed of polymer materials such as polyolefins (e.g., polyethylene, polypropylene, etc.), polyesters such as polyethylene terephthalate (PET), polylactic acid, polyamides (e.g., Nylon), polyacrylonitriles, etc. The different types of polymer materials can also include materials having the same or similar chemical formula but also having different melting points, different viscosities and/or other physical properties as a result of modification to the polymer material (e.g. two types of PET, where one or both are modified in some manner such that one type of PET has a lower melting point in relation to the other type of PET).

The synthetic fibers of the insulating layer 205 may be configured as structural fibers and/or binding fibers. Structural fibers are configured to improve the structural integrity of the nonwoven web, improving, for example, the rigidity and/or stretch resistance of the insulating layer 205. In an embodiment, hollow fibers formed of any of the above polymers may be utilized as the structural fiber. Hollow structural fibers can be particularly useful for enhancing the insulation properties of the nonwoven web, since the hollow portions of the structural fibers provide air spaces or pockets within the nonwoven web. The hollow structural fibers can further be conjugate fibers including two or more polymer components (e.g., one half of the annular portion forming a hollow fiber can comprise a first polymer component, while the other half of the annular portion can comprise a second polymer component). However, the structural fibers can also be solid or can include a blend of solid fibers and hollow fibers. In further embodiments, the structural fibers can also be crimped or even hollow with a crimped configuration. The crimped configuration for the structural fibers provides a better adherence or "latching on"/securement of the waterfowl fibers with the structural fibers when such fibers are combined during the production process.

The structural fibers may include any dimensions suitable for its described purpose. By way of example, the structural fibers may be staple fibers. By way of further example, the structural fibers can have lengths ranging from 10 mm (millimeters) to 100 mm, e.g., lengths ranging from 20 mm to 80 mm, such as lengths ranging from 30 mm to 70 mm, or ranging from 38 mm to 51 mm, or ranging from 40 mm to 45 mm, with specific and non-limiting examples being a length of about 51 mm and/or a length of about 64 mm. The structural fibers can further have a DPF (denier per fiber) ranging from 0.5 to 10, such as a denier ranging from 0.5 to 8.0 (e.g., a denier of about 1.0, about 2.0, about 3.0, about 4.0, about 5.0, about 6.0 or about 7.0).

The structural fibers can include a first group or first set of low DPF fibers and a second group or second set of high DPF fibers. The low DPF fibers can have a DPF no greater than about 3.0, while the high DPF fibers can have a DPF of at least about 3.0. For example, the low DPF fibers can have a DPF ranging from 0.5 to 3, such as from 1.0 to 2 or from 1.0 to 1.5. The high DPF fibers can have a DPF ranging from 3.0 to 8.0, such as from 3.5 to 4.5 or greater, or from 3.5 to 4.0. The low DPF fibers can also be texturized for particular applications to enhance the insulation properties of the nonwoven web formed including the structural fibers. The amount of low DPF to high DPF structural fibers provided in the nonwoven web can be selected to achieve certain desired features for the nonwoven web. For example, increasing an amount of high DPF structural fibers can enhance or increase loft for the nonwoven web, while increasing the amount of low DPF structural fibers can enhance or increase drape for the nonwoven web. The structural fibers used to form the nonwoven web can include 50% high DPF fibers and 50% low DPF fibers (i.e., an even ratio of the high and low DPF fibers). Alternatively, the structural fibers can include 10-50% by weight high DPF fibers and 50-90% low DPF fibers.

By modifying features such as denier of the structural fibers (e.g., providing a mixture of high and low DPF fibers), selection of one or more different fiber geometries (e.g., hollow, crimped hollow, solid, crimped solid, etc.), the number and types of polymer materials used to form the fibers (e.g., single component, bicomponent or multi component), a particular or suitable entangling with the waterfowl fibers can be achieved in the nonwoven web so as to create a suitable scaffold or network of entangled fibers during the web forming process. For example, fiber geometries and polymer components used to form the structural fibers, as well as varying DPF of fibers, can be selected to impart a desired level of crimp in some or all of the structural fibers that results in a desired entangling between structural fibers and/or waterfowl fibers which in turn results in imparting desired insulation properties, texture, porosity, thickness or loft, drape, and/or other physical properties to the nonwoven web formed from such fibers.

The structural fibers can also be treated, e.g., to prevent allergens, bacteria and/or dust from attaching to materials formed with the synthetic fibers (e.g., forming anti-microbial and/or hypoallergenic fibers). For example, PET fibers can be used that are siliconized (e.g., treated with a silicate material). A siliconized fiber, such as siliconized PET fibers, also provides a slick texture and better hand feel for the nonwoven textile product that is formed using such fibers.

In an embodiment, the structural fibers are hollow, crimped polyester fibers possessing a single denier and length or multiple deniers and lengths (e.g., 7D 64 mm hollow polyester fibers and 3D 51 mm hollow polyester fibers).

Along with structural fibers, the synthetic fibers may be configured as binding fibers. Binding fibers are fibers configured to coupled (e.g., bond) waterfowl fibers and/or structural fibers to each other, securing the fibers within the insulating layer 205. Additionally, the binding fibers may be configured to secure the scrim layers 210, 215 to the insulating layer 205. In an embodiment, the binding fibers include heat-sensitive fibers such as flowable (fusible) fibers and softening fibers. Flowable (fusible) fibers include polymers that possess a melting and/or glass transition point at which the solid polymer liquefies, generating viscous flow (i.e., becomes molten). In an embodiment, the melting and/or glass transition point of the flowable polymer may be approximately 80° C. to about 110° C. (e.g., about 90° C. to about 100° C.).

Examples of polymers used to form flowable fibers include thermoplastic materials such as polyurethanes (i.e., thermoplastic polyurethane or TPU), ethylene vinyl acetates, polyamides (e.g., low melt nylons), and polyesters (e.g., low melt polyester). Preferred examples of melting fibers include TPU and polyester. As a fiber becomes flowable, it surrounds adjacent fibers. Upon cooling, the fibers form a rigid interconnected structure that strengthens the textile and/or limits the movement of adjacent fibers.

Softening fibers are polymeric fibers that possess a softening point (the temperature at which a material softens beyond some arbitrary softness). Many thermoplastic polymers do not have a defined point that marks the transition from solid to fluid. Instead, they become softer as temperature increases. The softening point is measured via the Vicat method (ISO 306 and ASTM D 1525), or via heat deflection test (HDT) (ISO 75 and ASTM D 648). In an embodiment, the softening point of the strand is from approximately 60° C. to approximately 110° C. (e.g., 90° C.-100° C.). When softened, the fibers become tacky, adhering to adjacent fibers. Once cooled, movement of the textile strands is restricted (i.e., the textile at that location stiffens).

Binding fibers may possess any length suitable for its described purpose. For example, binding fibers can have lengths that are the same or similar to the lengths of structural fibers and/or waterfowl fibers. In an embodiment, the binding fiber length may range from 10 mm (millimeters) to 100 mm, e.g., from 20 mm to 80 mm, such as lengths ranging from 30 mm to 70 mm, or ranging from 38 mm to 51 mm, or ranging from 40 mm to 45 mm, with specific and non-limiting examples being a length of about 51 mm and/or a length of about 64 mm.

The binding fibers may also possess any denier (DPF) suitable for its described purpose. In an embodiment, the binding fibers have a DPF no greater than about 5.0, such as a high DPF no greater than about 4.0, or low DPF no greater than about 3.0.

In operation, the binding fibers possess a lower melting point or softening point than the polymer material forming the structural fibers so as to facilitate thermal bonding of the waterfowl fibers and structural fibers during formation of the insulating layer. After combining the binding fibers, with the structural fibers and waterfowl fibers, the composition is formed into a layer subjected to heat at a sufficient temperature and sufficient time period to melt the binder material which secures or bonds the waterfowl fibers with the structural fibers, forming a nonwoven web of fibers.

It should be understood that instead of or in addition to the binding fibers, a sprayable binder may be utilized. The binder may be material that is applied in the form of a spray (e.g., in spray droplets, as a spray foam or as a spray on powder) to the waterfowl fibers. The binder adhesively binds the waterfowl fibers and blending fibers together. The binder is a material sprayed onto the waterfowl fibers and/or blending fibers to adhesively bond the combined fibers together. The binder material can be applied in a liquid, semi-liquid (e.g., foam) or solid (e.g., powder) state, where adhesion and bonding can be initiated in any suitable manner depending upon the type of binder material used. For example, adhesion bonding of the combined fibers can be achieved by heating of the binder material to a suitable temperature. Alternatively, adhesion bonding can occur by drying and/or setting/curing of the sprayed binder material. In still further embodiments, the binder material can comprise a resin that is set or cured (thus providing bonding between the combined fibers of the nonwoven web) in response to exposure of the binder material to ultraviolet (UV) radiation.

The amount of each component (waterfowl fiber, structural fiber, and/or the binding fiber) may be selected to form a stable nonwoven structure having insulation properties sufficient for the desired end use (e.g., apparel). For example, the amount of waterfowl fibers within the nonwoven web can be in a range of 10% to 70% by weight, such as 20% to 50% by weight, about 40% by weight, or even about 25% to about 35% by weight of the nonwoven web (with any selected amounts of down fibers and feather fibers constituting the waterfowl fibers). Amounts below the range may lead to insufficient insulating effect. Amounts above the range, moreover, may affect the structural integrity of the web.

The amount of structural fibers within the insulating layer 205 (the nonwoven web) can be in a range of 10% to 70% by weight, such as 30% to 60% by weight, or about 40% by weight. Further combinations of two types of structural fibers can be provided in about a 50/50 mixture (i.e., a 1:1 ratio) making up the entire structural fiber content within the web. The amount of binding fibers within the insulating layer 205 (nonwoven web) can be in the range of 10% to 40% by weight, such as 10% to 30% by weight, or about 20% by weight. In certain embodiments, the ratio of the amount (by weight) of waterfowl fibers to binding fibers is about 2:1.

In an example embodiment, the insulating layer 205 is formed of up to about 40% by weight waterfowl fibers, about 40% by weight of a first PET material and about 20% by weight of a second PET material having a lower melting point temperature than the first PET material. In further embodiments, the structural and/or binding fibers can comprise hollow fibers (and/or any other suitable fiber geometries) to facilitate an increase in thermal properties of the nonwoven web formed. For example, the insulating layer 205 may include about 40% by weight waterfowl fibers, about 20% by weight low melt polyester fibers (as binder material), and about 40% by weight structural fibers in the form of hollow polyester fibers and solid fibers formed from recycled polyester commercially available under the tradename REPREVE (Unifi, Inc., North Carolina). In another example, the insulating layer 205 includes no more than about 40% (e.g., about 25% to about 35% by weight) waterfowl fibers, about 40% by weight of two types of hollow and crimped siliconized PET structural fibers (each fiber type having a different denier), and about 20% by weight low melt binding fibers (e.g., polyurethane and/or PET).

The insulating layer 205 may be formed as a nonwoven web utilizing any suitable laydown process. Exemplary laydown processes include an airlay process, a wetlay process and a carding process. Airlaid and carding machines are known for processing bales of fibers (e.g., staple fibers) and generally orienting the fibers in one or more suitable, predetermined directions to produce nonwoven webs having desired strength characteristics in both the machine direction (MD) and the cross direction (CD). Generally, airlaid machines utilize blown air to direct fibers opened from the batting onto a rotating cylinder or drum, where the fibers are then drawn off the drum to form the nonwoven web. An airlaid system for processing the waterfowl fibers can further include a closed or enclosed vacuum system to help control the opening and orientation of such fibers in creating the nonwoven web.

A wetlay process utilizes water (or another liquid) combined with the fibers to form a slurry that is laid down on a surface (e.g., a moving wire screen), where the water is then removed by draining from the formed web.

Carding machines utilize a combination of a conveying cylinder or drum that moves the batting against stationary plates that function to open and "comb" the fibers within the batting in one or more orientations so as to form the nonwoven web. Control of the fibers (in particular, the waterfowl fibers) can be achieved during the laydown process by applying a water mist to the fibers after they are laid down and/or utilizing an enclosed system to prevent unwanted air currents from disturbing the fibers after being laid down.

The scrim layers 210, 215 are configured to prevent migration of the fibers from the structure (i.e., fly-away). The scrim layers may be formed of the same or different materials. In an embodiment, each scrim layer 210, 215 is a textile (e.g., a nonwoven textile) formed of polyester (e.g., polyethylene terephthalate (PET)) or polypropylene. Each scrim layer 210, 215 may possess a basis weight in the range of 2 gsm (grams/m2) to 30 gsm, such as a range of 5 gsm to 20 gsm (e.g., 12-15 gsm). In an embodiment, each scrim layer 210, 215 is a polypropylene nonwoven textile having a basis weight of about 20 gsm. The scrim layers may be breathable, permitting movement of air and/or watervapor therethrough.

Once formed, the insulation material 200 possesses insulating properties. That is, the matrix of fibers in the insulating layer 205 provides loft, which enables the capture of air, thereby enabling thermal insulation properties. In addition, the insulating layer may be configured to be generally or substantially free of waterfowl plumage. That is, forming the described structure utilizing a blend of synthetic and waterfowl fibers avoids the need to utilize conventional waterfowl plumage. This resulting insulation material 200 possesses thermal resistance properties and lightweight characteristics that are similar or even superior to those of known or conventional down insulation materials (e.g., down insulation material used as thermal insulation for jackets or other types of apparel). For example, insulation formed in accordance with the present invention can have a clothing insulation value, as measured in Clo units (where 1 Clo=0.155 $K \cdot m^2 \cdot W^{-1} \approx 0.88$ R (where R=$ft^2 \cdot °F \cdot hr/Btu$)), in the range of 2-4 Clo (a standard range for apparel insulation). The insulation is further formed having a suitable loftiness, where a thickness of the insulation material 200 that are formed can be in a range from about 10 mm to about 25 mm. The insulation material formed can also be lightweight, e.g., having an average density in the range of 2.5-4 oz/yd$^2$ (e.g., about 3 oz/yd$^2$).

Figure 4:
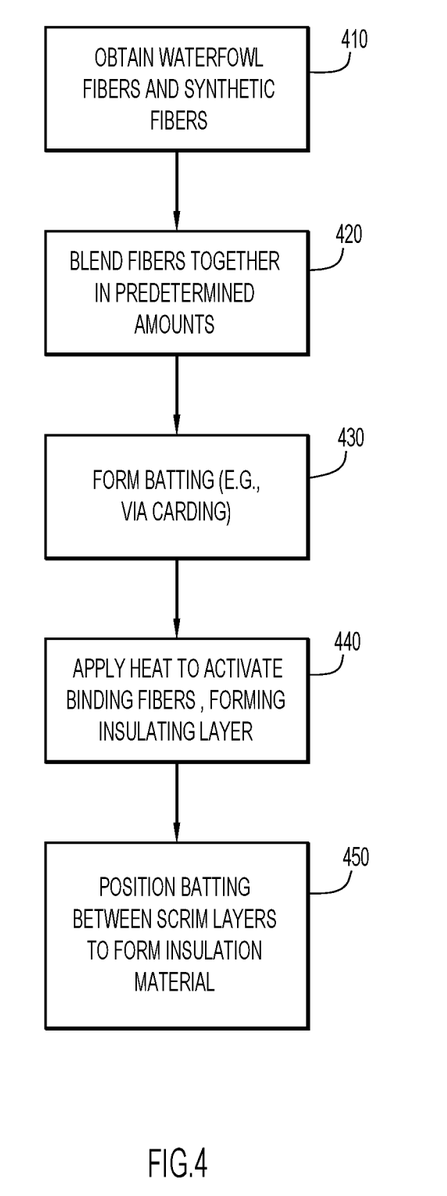
FIG. 4 depicts a flowchart of an example process for forming a nonwoven web including down fibers in accordance with the present invention.
Figure 5:
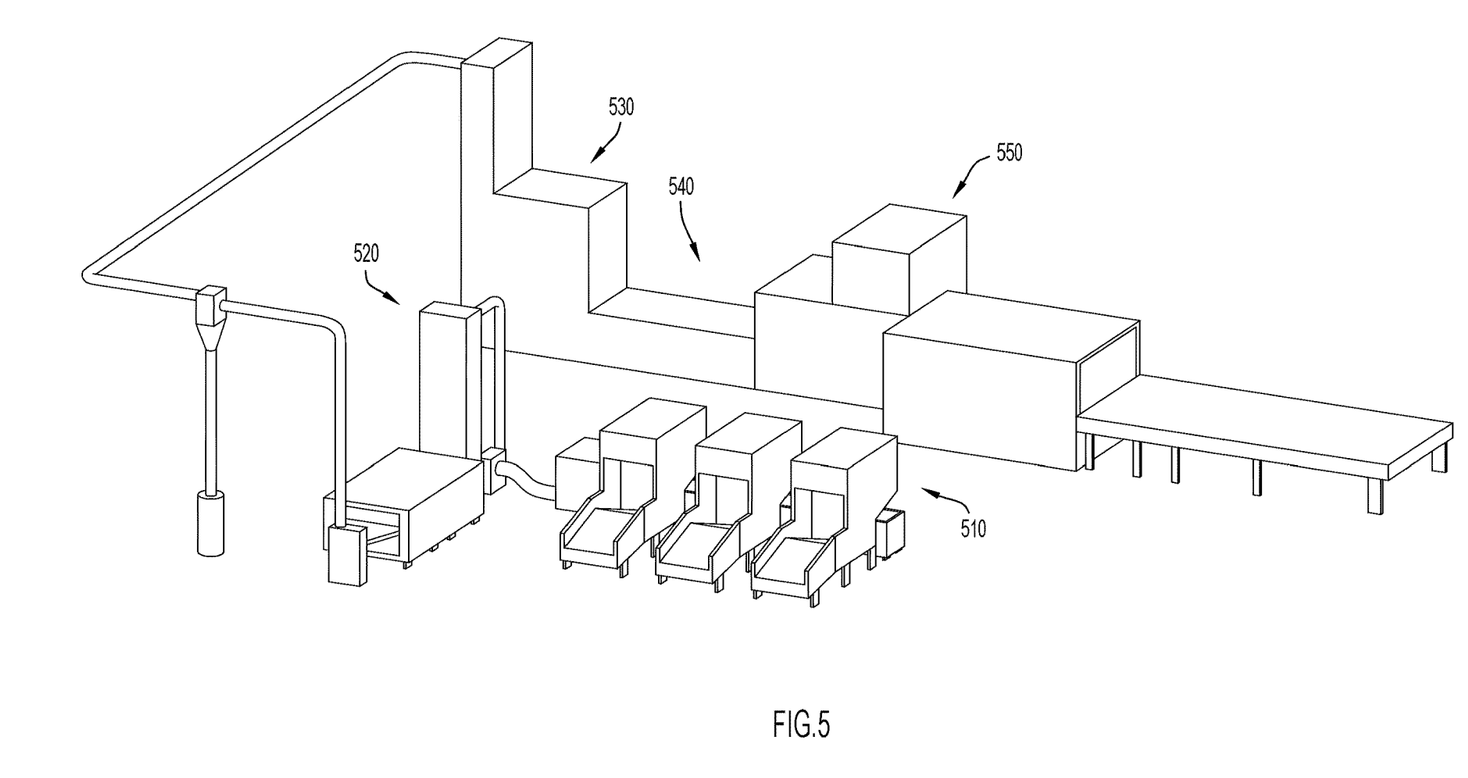
FIG. 5 depicts an example embodiment of a system for forming a nonwoven web including down fibers in accordance with the present invention.

Some example embodiments of forming a nonwoven web comprising waterfowl fibers, synthetic structural fibers and synthetic binding fibers are now described with reference to the flowchart of FIG. 4 and the web forming system schematically depicted in FIG. 5. At the start of the process, structural fibers, binding fibers and waterfowl fibers are initially obtained. For example, at step 410 (FIG. 4), bales of each type of fiber can be provided and opened (e.g., at one or more bale opener machines 510, as depicted in FIG. 5), where the fibers can be cleaned (e.g., removal of dust and/or other particulate matter from the opened bale of fibers). The waterfowl fibers can optionally be obtained as waste received from a production facility that is processing down, waterfowl feathers and/or waterfowl plumage to produce a down and/or feather product. The waterfowl fibers can further be washed and/or saturated with water prior to combining with the structural and/or binding fibers. At step 420, the fibers opened from the bales are blended together in desired amounts utilizing a fine opener machine 520 (FIG. 3). The resulting fiber mixture includes a generally uniform dispersion of the waterfowl, structural and binding fibers.

After combining the fibers, the composite is directed (e.g., via rollers) to a suitable web-forming system at 430, such as an airlaid machine (e.g., airlaid machine 530 depicted in FIG. 5) or a carding machine to form a nonwoven web or a matt or insulation batting (e.g., an entanglement) of the fibers.

The nonwoven web is heated at step 440. Referring to the system of FIG. 5, the nonwoven web/batting can be directed (e.g., via rollers) through an oven 550 which heats the nonwoven web for a sufficient period of time to soften and/or melt the binder material in the synthetic fibers so as to form a bonded nonwoven web with waterfowl fibers secured or bonded to blending fibers. In an example embodiment in which low melt binder fibers (e.g., PET and/or polyurethane binder fibers) are utilized having a melting point of about 90° C., the oven can be operated to heat the web within the oven to a temperature within a range of about 90° C. to about 100° C. for a suitable period of time (e.g., sufficient residence time within the over) so as to sufficiently soften and/or melt the binder fibers in order to form bonding between the binder fibers, structural fibers and waterfowl fibers.

At step 450, textile scrim, such as a nonwoven scrim, is applied to either or both sides of the nonwoven web. The addition of the scrim layer(s) to the nonwoven web can be applied, e.g., at location 540 for the system depicted in FIG. 5. By way of specific example, the web-forming system may place the batting on a first scrim layer, with subsequent application of a second scrim layer on top of the composite. The binding fibers, still in their flowable state, secure the scrim layers to the web. If desired, pressure may be applied via rollers. Furthermore, an iron may be utilized to apply heat and pressure.

In other embodiments (e.g., embodiments in which the nonwoven web is formed without a scrim layer), a woven mat can be laid onto the nonwoven web prior to entering the oven 550, where the mat is then removed and separated from the nonwoven web emerging from the oven.

After formation of the nonwoven web (e.g., after step 450), the web can be wound onto a roll for storage and/or use in a further process for forming a textile product (e.g., insulation batting an article of apparel The following example describes the formation of a nonwoven web product including waterfowl fibers (with feather fibers and down fibers).

EXAMPLE

A nonwoven web was formed using waterfowl fibers (including down and feather fibers), synthetic staple fibers (including polyethylene terephthalate (PET) structural fibers) and low melt PET binding fibers (with the PET used to form the binder fibers has a lower melting point than the PET used to form the structural fibers). The down fibers and feather fibers were obtained from waste collected from a down and/or feather processing facility. The structural fibers included hollow and crimped siliconized PET fibers. The waterfowl fibers were saturated with water and then combined with the structural and low melt binder fibers. All the fiber compositions were weighed prior to being placed into a blending machine, and the weight percentages (based upon the total weights measured) as well as other structural characteristics of the fibers were as follows:

| Fiber | Staple length | Denier | Weight percentage |
|---|---|---|---|
| Siliconized PET (hollow and crimped) | 64 mm | 7 D | 20% |
| Siliconized PET (hollow and crimped) | 51 mm | 3 D | 20% |
| Low melt PET (melting point is 90° C.) | 51 mm | 4 D | 20% |
| Waterfowl fibers (down fibers and feather fibers) | | | 40% |

After weighing to achieve the above weight percentages, the fibers were placed into a blending machine to mix the fibers together. The mixed fibers were next conveyed (via rollers) to a carding machine to yield a batting material. The batting material was sent (via a conveyor belt) to an oven and heated to a temperature between about 90° C. and about 100° C. The heating process softens or melts the binder fibers to bind the structural and waterfowl fibers together in the formed nonwoven web. The nonwoven web is then moved (e.g., via rollers) and collected on a roll. The nonwoven web material that was formed can be used for batting insulation material, e.g., for apparel (e.g., jackets and other clothing), mattresses, bedding (e.g., comforters), pillows, and any other textile product.

In other embodiments, a textile scrim (e.g., a thin nonwoven textile material comprising polypropylene) is added to top and bottom sides of the nonwoven web emerging from the oven. The scrim can be secured to each side of the nonwoven web by directing the web through a set of rollers to adhere the scrim on each side to the web. No adhesive was required. However, in other embodiments, an adhesive can be used to adhere the scrim to either side of the nonwoven web.

In the final nonwoven web product, the amount of waterfowl fibers can change slightly from about 40% by weight of the product to about 25%-35% by weight of the product. This may be the result of the initial weighing of the waterfowl fibers that are saturated with water (where the water is removed from the final product). The final product included synthetic fibers (structural fibers and binding fibers) varying in deniers of 3D, 4D and 7D.

With the above construction, an insulating layer 205 containing about 20% or more waterfowl fibers is provided (e.g., about 20% by weight to about 40% by weight of the insulating layer). The disclosed construction enables a fiber-containing insulating layer 205 that is generally free of waterfowl plumage (down, down clusters, and/or feathers). By generally free, it is intended to mean that plumage is present in an amount of no more than about 20% by weight of the insulating layer. In a further embodiment, the insulating layer 205 is substantially free of waterfowl plumage. By substantially free, it is intended to mean that the plumage is present in an amount of no more than about 10% by weight of the insulating layer (e.g., about 5% by weight or less).

While the invention has been described in detail and with reference to specific embodiments thereof, it will be apparent to one skilled in the art that various changes and modifications can be made therein without departing from the spirit and scope thereof.

For example, the insulation material, along with its use in a jacket, may be utilized as an insulation layer in a hat, glove, mitten, sock, shoe, boot, pants, shirt, coat, etc.

While amounts of waterfowl plumage of no more than about 20% by weight of the insulating layer are discussed, the amount of waterfowl plumage may be greater, if desired. For example, waterfowl plumage may be present in an amount of no more than 50% by weight of the insulating layer (e.g., no more than 40% by weight or no more than 30% by weight). The remainder of the insulating layer would include the fiber components (waterfowl fiber, structural fiber and/or binding fibers).

The synthetic fibers used to form the nonwoven web can be formed in any suitable manner including, without limitation, via a melt spinning (e.g., spunbond) process, via a melt blown process, etc. The synthetic fibers used to form the nonwoven web can be continuous fibers or filaments that are applied (e.g., laid down) on a support surface (e.g., a movable lay down conveyor surface) and then combined with the waterfowl fibers. Alternatively, the synthetic fibers can be staple fibers (e.g., fibers formed from a melt spinning or melt blown process and then cut to specified lengths) that are combined with the waterfowl fibers.

the structural fibers may be further include fibers having different cross-sectional configurations. Some examples of cross-sectional configurations for the synthetic fibers can include, without limitation, side-by-side (SBS) configurations that include two or more polymer materials (e.g., bicomponent fibers, tricomponent fibers, etc.), sheath-core (SC) fibers, island-in-the-sea (INS) fibers, segmented pie fibers, etc. The cross-sectional configurations can further include any suitable types of shapes including, without limitation, round, oval or elongated, square or multi-faceted, irregular shaped, hollow (e.g., annular in cross-section), crimped, etc.

By way of example, the structural fibers may be formed of segments oriented in a side-by-side (bilateral) relationship, being connected along the length of the strand. The segments may be symmetrical or eccentric (the polymer components are asymmetrical), in which a first polymer component possesses more volume and/or mass than a second polymer component. In a further embodiment, a structural fiber can be a conjugate fiber including first and second polymer components, where the first polymer component may be formed of a polymer possessing a first shrinkage rate (when exposed to wet or dry heat) and the second polymer component may be formed of a polymer possessing second shrinkage rate. Accordingly, when the fiber is exposed to heat, the polymer components shrink at different rates, generating coils within the fiber, aiding in the loft of the nonwoven web.

By way of specific example, the fiber is a polyester bicomponent strand. A polyester bicomponent strand is a continuous filament having a pair of polyesters connected side-by-side, along the length of the filament. Specifically, the polyester bicomponent strand may include a poly(trimethylene terephthalate) and at least one polymer selected from the group consisting of poly(ethylene terephthalate), poly(trimethylene terephthalate), and poly(tetramethylene terephthalate) or a combination thereof. By way of example, the polyester bicomponent filaments include poly(ethylene terephthalate) and poly(trimethylene terephthalate) in a weight ratio of about 30/70 to about 70/30. In a preferred embodiment, the first polyester component is a 2GT type polyester polyethylene terephthalate (PET) and the second polyester component is a 3GT type polyester (e.g., polytrimethylene terephthalate (PTT)). In an embodiment, the 2GT type polyester forms about 60 wt % of the strand, while the 3GT type polyester forms about 40 wt % of the strand.

For example, while embodiments have been described herein for textile materials comprising nonwoven webs that include waterfowl fibers, structural (synthetic) fibers and a binder material (e.g., binder fibers having a lower softening or melting point in relation to the structural fibers and/or the waterfowl fibers), the nonwoven webs can further include a combination of just waterfowl fibers with structural fibers, or a combination of just waterfowl fibers with binder material. In addition, structural fibers are not limited to synthetic fibers but instead can also include natural fibers, such as cotton, silk or wool fibers.

Thus, it is intended that the present invention covers the modifications and variations of this invention provided they come within the scope of the appended claims and their equivalents. It is to be understood that terms such as "top," "bottom," "front," "rear," "side," "height," "length," "width," "upper," "lower," "interior," "exterior," "medial," "lateral," and the like as may be used herein, merely describe points of reference and do not limit the present invention to any particular orientation or configuration.

What is claimed:

1. A method of forming an article of apparel, the method comprising:
   blending synthetic fibers and waterfowl fibers to form a blended composition;
   carding the blended composition to form batting;
   applying a scrim layer to the batting to form insulation material; and
   incorporating the insulation material between a first apparel layer and a second apparel layer to form an article of apparel.

2. The method of claim 1, wherein the blended composition comprises at least 20% by weight waterfowl fibers.

3. The method of claim 1, wherein:
   the synthetic fibers include fusible fibers possessing a melting point; and
   the method further comprises applying heat to soften the fusible fibers.

4. The method of claim 3, wherein:
   the melting point of the fusible fibers is a first melting point;
   the synthetic fibers further comprise structural fibers possessing a second melting point;
   the first melting point is lower than the second melting point.

5. The method of claim 1, wherein:
the first apparel layer comprises an outer shell layer; and
the second apparel layer comprises an inner lining layer.

6. The method of claim 1, further comprising:
obtaining the waterfowl fibers by separating the waterfowl fibers from waterfowl plumage;
wherein the insulating material contains no more than 20% by weight of waterfowl plumage.

7. A method of forming an article of apparel, the method comprising:
blending synthetic fibers and waterfowl fibers to form a blended composition;
carding the blended composition to form batting;
applying a scrim layer to the batting to form insulation material; and
incorporating the insulation material between a first apparel layer and a second apparel layer to form an article of apparel;
wherein the synthetic fibers blended with the waterfowl fibers comprise synthetic, non-fusible structural fibers and synthetic, fusible binder fibers, and the insulating material comprises:
25%-45% waterfowl fibers, by weight of the insulating material;
35%-55% synthetic, non-fusible structural fibers, by weight of the insulating material; and
15%-25% synthetic, fusible binder fibers, by weight of the insulating material.

8. The method of claim 7, wherein the synthetic, non-fusible structural fibers comprise hollow polyester fibers, and the synthetic, fusible binder fibers comprise solid polyester fibers possessing a melting point of about 90 degrees Centigrade to about 100 degrees Centigrade.

9. The method of claim 7, wherein the synthetic, fusible binder fibers possess a melting point lower than the synthetic, non-fusible structural fibers.

10. The method of claim 7, wherein the synthetic, fusible binder fibers possess a melting point from about 80° C. to about 100° C.

11. A method of forming an article of apparel, the method comprising:
blending synthetic fibers and waterfowl fibers to form a blended composition, wherein at least some of the synthetic fibers are hollow;
carding the blended composition to form batting;
applying a scrim layer to the batting to form insulation material; and
incorporating the insulation material between a first apparel layer and a second apparel layer to form an article of apparel.

12. The method of claim 11, wherein the synthetic fibers comprise hollow structural synthetic fibers and solid fusible synthetic fibers, wherein the fusible fibers have a lower melting point in relation to the structural fibers.

13. The method of claim 11, wherein the hollow synthetic fibers comprise a first plurality of hollow fibers possessing a first fiber length, and a second plurality of hollow fibers possessing a second fiber length that differs from the first fiber length.

14. The method of claim 11, wherein the blended composition comprises at least 20% by weight waterfowl fibers.

15. The method of claim 11, wherein:
the first apparel layer comprises an outer shell layer; and
the second apparel layer comprises an inner lining layer.

16. The method of claim 11, further comprising:
obtaining the waterfowl fibers by separating the waterfowl fibers from waterfowl plumage;
wherein the insulating material contains no more than 20% by weight of waterfowl plumage.

* * * * *